United States Patent [19]
Weaver et al.

[11] Patent Number: 6,004,576
[45] Date of Patent: Dec. 21, 1999

[54] GRANULAR PLASMA PROTEIN SUPPLEMENT WITH INCREASED BIO-EFFICACY

[75] Inventors: Eric M. Weaver, Story City; Joy M. Campbell, Ames; Louis Russell, Des Moines, all of Iowa

[73] Assignee: AMPC, Inc., Ames, Iowa

[21] Appl. No.: 09/015,179

[22] Filed: Jan. 29, 1998

Related U.S. Application Data

[60] Provisional application No. 60/055,339, Aug. 11, 1997.

[51] Int. Cl.$^6$ ..................................... A61K 9/16
[52] U.S. Cl. ................. 424/442; 424/484; 424/489; 424/499; 424/530; 426/647
[58] Field of Search ............... 426/647; 424/442, 424/530, 438, 484, 489, 499

[56] References Cited

U.S. PATENT DOCUMENTS

| | | | |
|---|---|---|---|
| 609,057 | 8/1898 | Sorensen | 426/647 |
| 1,673,964 | 6/1928 | Atwood | 426/647 |
| 1,787,585 | 1/1931 | McBeth et al. | 514/939 |
| 3,859,734 | 1/1975 | Wahlgren . | |
| 3,928,566 | 12/1975 | Briggs et al. | 424/530 |
| 5,575,999 | 11/1996 | Yoder | 424/94.6 |
| 5,637,345 | 6/1997 | Lee et al. | 436/647 |
| 5,785,990 | 7/1998 | Langrehr | 429/442 |

FOREIGN PATENT DOCUMENTS

| | | | |
|---|---|---|---|
| 0 020 231 | 12/1980 | European Pat. Off. | C05F 1/00 |
| 0 023 161 | 1/1981 | European Pat. Off. | C05F 1/00 |
| 29 41 637A | 12/1980 | Germany | A23K 1/00 |

OTHER PUBLICATIONS

Spray dried Plasma and Cellular protein products Jannaber et al : Kraftfutter #5, pp. 227–235, 1997.

Spray dried Blood Plasma and spray dried blood cells Peet–Schwering et al : Proefverslag–Proefstation voor de varkenshouderij #1.168 pp. 1–20, 1997.

"Low Moist Blood Product Preparation Block Coagulate Centrifuge Dry Blood", Derwent Publication, Abstract XP002084343, 1989.

U. Jannaber et al., "Spruhgetrocknete Plasma–und Zelleiweissprodukte als Eiweissquellen fur Ferkel", *Kraftfutter*, No. 5, 1997, pp. 227–235.

AP 920™ Spray–Dried Animal Plasma product information provided by American Protein Corporation, Ames, Iowa, Dec. 1996.

*Primary Examiner*—Neil S. Levy
*Attorney, Agent, or Firm*—Zarley, McKee, Thomte, Voorhees & Sease

[57] ABSTRACT

A feed supplement is disclosed comprising animal plasma purified from animal blood which is granulated. Animals fed this supplement experienced a significantly higher average daily gain and increased average daily feed intake when compared with a control of feed supplemented with plasma protein powder.

9 Claims, 3 Drawing Sheets

GRANULAR PLASMA PROTEIN SUPPLEMENT WITH INCREASED BIO-EFFICACY

CROSS-REFERENCE TO RELATED APPLICATION

This application is a continuation-in part of copending, commonly owned provisional application Ser. No. 60/055,339 filed Aug. 11, 1997.

BACKGROUND OF THE INVENTION

It has long been known that the first few weeks of life for animals are critical for growth and survival. However, livestock animals, particularly pigs and calves are commonly weaned at a younger age (1 to 35 days of age) to reduce the cost of production and in some cases to improve health status. Much has been learned about management methods necessary for early-weaning; however challenges remain for livestock producers because the animals are young and susceptible to disease. Many factors affect the susceptibility of the young animal to disease but, disease exposure and immunological status are two of the critical factors in an animal's susceptibility to a particular disease. The dam is a recognized vector and source of disease exposure for enteric and respiratory disease agents. Thus, the young animal (1 to 28 days of age) is removed from the dam (early-weaning) to prevent the horizontal transmission of certain diseases. A technique such as early-weaning benefits the animal through improved health but feeding and management of such a young animal becomes a very formidable task. Young animals are adept at nursing, digesting, and absorbing the nutrients from their primary nutrient source, milk. The feeding of milk, however, is labor intensive and expensive. Therefore, producers attempt to feed simpler, more cost-effective diets based on grains and forages. The digestive system of the young animal is not mature enough to digest such a simple diet. Thus, very young pigs and calves in the postweaning period experience a syndrome identified as postweaning lag.

The symptoms of post weaning lag usually include slow growth, low feed intake, and frequent occurrence of diarrhea. The syndrome can result in moderate to high production losses on commercial farms. The loss is the result of slow growth, high morbidity (25%) and high mortality rates (up to 10% of the population). The lightest and youngest animals in the population are often the most severely affected. Postweaning lag is most common in pigs (1 to 35 days of age) exposed to environmental and microbiological challenges.

Nutrient-rich, highly-digestible feeds have been specifically formulated to counter the effects of weaning on feed intake of the young animal. Such feeds/diets are very nutritious and highly fortified to provide the energy and nutrients for rapid growth. The diets consist primarily of processed grains (corn, wheat, barley, rice, etc.), gelatinized starches, milk products (dried skim milk, dried whey, lactose, dried whey protein concentrate, casein, etc.), sugars (dextrose, glucose, sucrose), fats and/or oils (lard, grease, vegetable oils, coconut oil, etc.), animal proteins (fishmeal, bloodmeal, meat meal, etc.), and refined, extruded soybeans (soy protein isolate, soy protein concentrate). However, even with the utilization of such high-quality diets, early-weaned pigs do not consume adequate quantities of feed to promote rapid growth. Upon weaning, these pigs frequently must be encouraged to eat using labor intensive practices such as frequent-feeding of liquid milk-replacers. The digestive capacity of these pigs is simply too immature to digest and assimilate nutrients from the grain and/or vegetable-based diets upon which the animal must now subsist. Thus, without the essential enzymes to digest and convert several complex energy sources into utilizable energy substrates such as glucose and short-chain fatty acids (from adipose tissue breakdown) and amino acids. The physiologically-catabolic state results in a loss of body weight from weaning to 14 days postweaning due to negative protein and energy balance.

Post-weaning lag (poor appetite, slow growth and diarrhea) is dramatically-reduced when newly-weaned pigs are fed a starter diet supplemented with dried animal plasma. Appetite and weight gain in small, newly weaned pigs is improved with supplementation of the pig starter with spray-dried animal plasma (DAP) (Hansen et al., 1993; de Rodas et al., 1995; Kats et al., 1994). In fact, the dietary improvement resulting from the supplementation of the newly-weaned pig feed with dried animal plasma is so dramatic it has allowed the swine industry to reduce weaning age from 28 to 21 days of age without a noticeable change in the incidence of the postweaning lag syndrome. The protein components involved in the response to dietary supplementation of dried animal plasma include immunoglobulin and albumin (Weaver and Russell, 1994; Cain et al., 1994; Owen et al., 1994). The product available to the industry to date, (and evaluated in the previously mentioned references) has been a spray-dried animal plasma in powder form. Spray-dried animal plasma in the powder form has been available to the food and feed industries for many years. The product has at times been co-dried with other feed or food ingredients such as milk or whey-products.

It has also been discovered that a blended powdered feed supplement comprising animal plasma protein and a microbial fermentation product of primarily amylase is even more effective in improving weaned pig performance than animal plasma protein alone. Yoder U.S. Pat. No. 5,575,999.

According to the invention it has been discovered, quite unexpectedly, that the average daily gain of animals fed a diet containing a granular form of spray-dried animal plasma is significantly better than animals fed a diet supplemented with similar levels of animal plasma powder, this effect is not observed with the red blood cell component of blood.

It is therefore an object of the present invention to provide a granulated protein feed supplement which will increase weight gain and feed efficiency for animals.

Another object of the present invention is to provide a protein supplement with increased bio-efficacy obtained by granulating plasma or any of its components.

It is a further object of the present invention to provide feed or a protein supplement with increased flowability, reduced dustiness and improved ease of handling.

These and other objectives will become apparent from the following description of the invention.

SUMMARY OF THE INVENTION

This invention provides for the first time a granulated, animal plasma supplement which works to increase weight gain, feed intake and feed efficiency of animals. According to the present invention, blood (porcine, bovine, ovine, equine, or avian) is collected and separated into cellular material and plasma. The resulting plasma component or any of the proteins purified from this component are then granulated. The product of the invention may be added to animal feed as a supplement which increases weight gain and health of animals, particularly in the first stages of life. Animals so treated with the granulated supplement of the invention experienced significant increases in weight gain as well as a much improved feed efficiency in comparison to animals treated with a powdered animal plasma protein-supplemented control diet. This effect of granulation was not observed with the separated cellular material.

BRIEF DESCRIPTION OF THE DRAWINGS

Relative biological value (RBV) is defined as the change in the dependent variable with titration of the test substance compared to the same change with the titration of a standard compound. RBV is used to describe bio-efficacy in this invention.

DETAILED DESCRIPTION OF THE INVENTION

Figure 1:
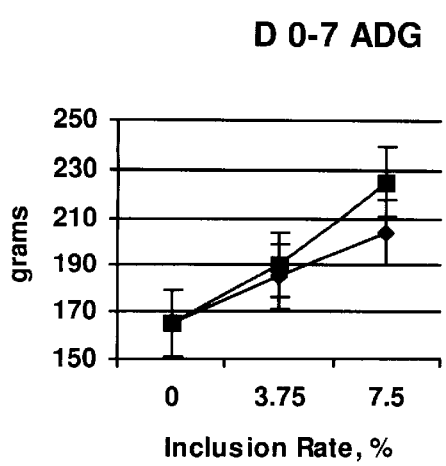
FIG. 1 is a graphical representation of the data from Table 5, comparing the average daily gain (ADG) of pigs fed a diet supplemented with granular plasma averaged across 2 pelleting temperatures versus pigs fed a diet supplemented with powdered plasma averaged across 2 pelleting temperatures on days 0–7 of the experiment described in Example 2. (ADG=164+5.3 (powder plasma, % of diet); ADG=164+7.8 (granular plasma, % of diet); and RBV=(7.8/5.3)100=147%)
Figure 2:
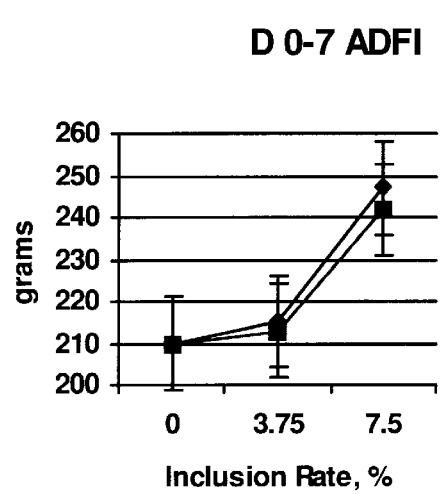
FIG. 2 is a graphical representation of the data from Table 5, comparing the average daily feed intake of pigs fed diets supplemented with granular plasma versus pigs fed diets supplemented with powdered plasma averaged across 2 pelleting temperatures versus pigs fed a diet supplemented with powdered plasma averaged across 2 pelleting temperatures on days 0–7 of the experiment described in Example 2. (ADFI=205+5.0(powder plasma, % of diet); ADFI=205+4.3 (granular plasma, % of diet); and RBV=(4.3/5.0)100=86%).
Figure 3:
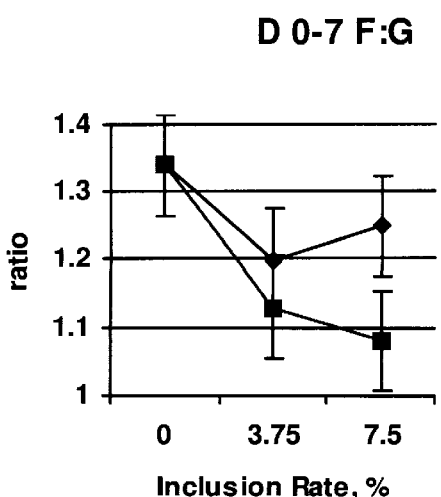
FIG. 3 is a graphical representation of the data from Table 5, comparing the feed/gain ratio of pigs fed a diet supplemented with granular plasma versus pigs fed a diet supplemented with powdered plasma averaged across 2 pelleting temperatures versus pigs fed a diet supplemented with powdered plasma averaged across 2 pelleting temperatures on days 0–7 of the experiment described in Example 2. (F/G=1.31–0.012) (powder plasma, % of diet); F/G=1.31–0.034) (granular plasma, % of diet); and RBV=(–0.034/–0.012) 100=283%)
Figure 4:
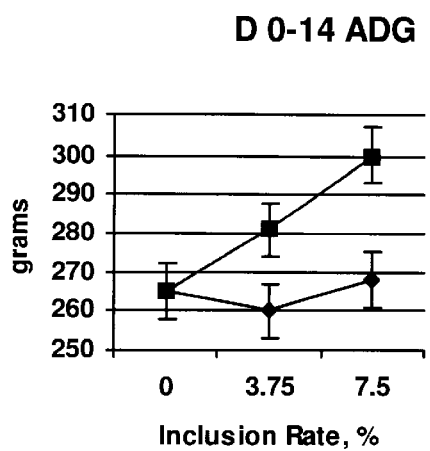
FIG. 4 is a graphical representation of the data from Table 5, comparing the cumulative daily gain of pigs fed diets supplemented with granular plasma averaged across 2 pelleting temperatures versus powdered plasma averaged across 2 pelleting temperatures on days 0–14 of the experiment described in Example 2. (ADG=264+0.2(plasma powder, % of diet); ADG=264+4.8(granular plasma, % of diet); RBV=4.8/0.2)100=2,400%).
Figure 5:
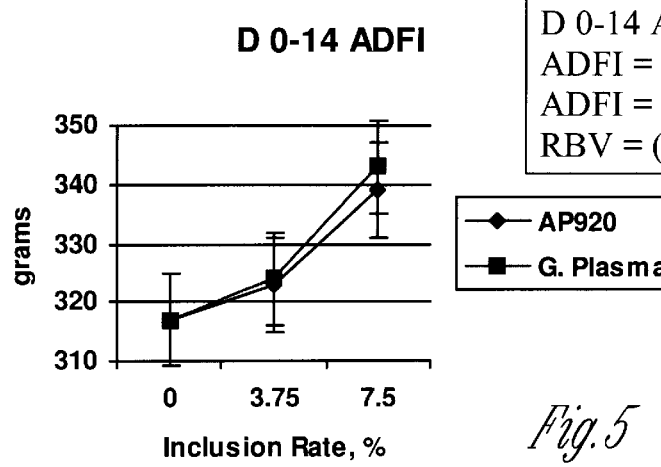
FIG. 5 is a graphical representation of the data from Table 5, comparing the cumulative feed intake of pigs fed diets supplemented with granular plasma averaged across 2 pelleting temperatures versus powdered plasma averaged across 2 pelleting temperatures on days 0–14 of the experiment described in Example 2. (ADFI=315+2.9(plasma powder, % of diet); ADFI=315+3.5(granular plasma, % of diet); and RBV=3.5/2.9)100=121%).
Figure 6:
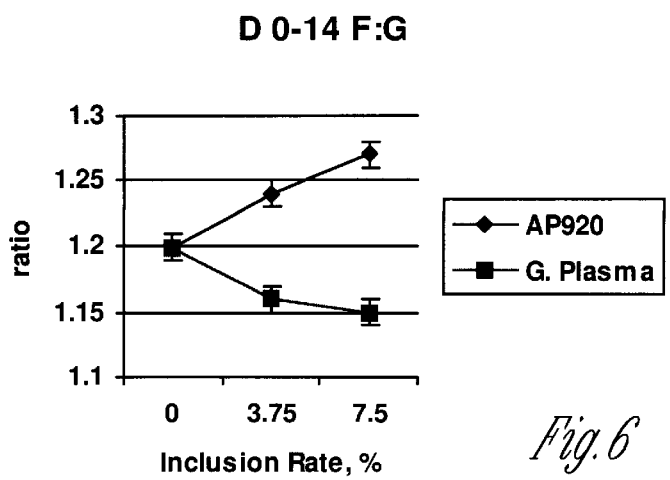
FIG. 6 is a graphical representation comparing the cumulative feed/gain ratio of pigs fed diets supplemented with granular plasma averaged across 2 pelleting temperatures versus powdered plasma averaged across 2 pelleting temperatures on days 0–14 of the experiment described in Example 2. Due to the granular plasma and powder plasma having negative and positive slopes, calculations of RBV is both mathematically and biologically unfeasible. Therefore, no calculations are reported.

According to the present invention, plasma obtained from animal sources is granulated and fed with other feed ingredients to animals such as pigs and calves. Any animal in which it is desirable to increase growth, particularly at the early stages of life, can be fed the composition according to the invention, this includes but is not limited to cats, dogs, calves, sheep, pigs, chickens, turkeys, ducks, horses, goats or aquaculture. The plasma is obtained by collecting blood from animals. The blood from any red blooded animal (porcine, bovine, ovine, equine, avian sp.) can be used to practice the invention. In a preferred embodiment the animal is a livestock animal which is slaughtered for its meat product. The blood, which is traditionally discarded or dried and processed as blood meal, may then be used for preparation of the compositions and implementation of methods of the invention. In a most preferred embodiment the blood is collected from pigs or cattle.

Generally, according to the invention, blood is collected, preferably at slaughter plants. In one embodiment, the blood may be held in a circulating stainless steel tank with anti-coagulants such as sodium citrate or sodium phosphate to prevent clotting. Prevention of clotting is not essential to the invention as similar effects can be obtained with clot-removed serum or defibrinated plasma. Typically, the whole blood is then separated, preferably by centrifugation, although any other separation method may be used, into two parts, the cellular material (red corpuscles, white corpuscles, platelets, and other circulating precursor cells of the previous categories of cells) and plasma (or serum). Plasma (serum) is composed of about 55–60% albumin, 25–30% globulin, 10% fibrinogen, and other proteins. As used herein the term "plasma" shall include the plasma portion of blood as well as any of the protein components which may be further purified therefrom. Purification of these components from plasma are methods known and commonly practiced by those of skill in the art. After separation, the plasma may be cooled to retard growth of bacteria and stored in an insulated tank until ready to dry.

Plasma and/or the purified components of plasma, may then be further concentrated (by membrane filtration). The concentrated product is next dried, preferably by spray-drying to form a beige powdery substance. Spray-drying should occur at temperatures low enough to prevent the complete denaturation of proteins but high enough to eliminate bacterial and viral contamination. Traditionally, a drier inlet temperature of approximately 3750 to 400° F. and an outlet temperature from the drier of 180–200° F. will accomplish this objective. The resulting powdery substance will have a particle size of about 5 to about 30 microns. The powder then compacted or compressed (around 1200 to 1400 psi), ground and optionally may be screened or otherwise separated by size to increase homogeneity. The resulting particle size is at least about 50 microns. Preferably the size is greater than about 100 microns but less than about 2000 microns in diameter. This size is sufficient so that the granulated particles are able to pass from the stomach to the small intestine without breakdown into smaller particles by the stomach. In addition to granulation, many methods, such as pelleting, wet or dry agglomeration, prilling, and fluid-bed drying, may be used to increase the particle size and density of dried plasma and/or its component proteins without causing significant denaturation and are intended to be included within the scope of the invention. The granulation of plasma results in a bulk density increase of from about 32 pounds per cubic foot in powder form to about 50 pounds per cubic foot in granular form. Quite unexpectedly the resulting granular product synergistically results in weight gain and efficiency beyond that expected for similar amounts in powdered form.

The resulting granular substance may then be combined with other feed ingredients for any desired feeding regime or may be blended with a feed ingredient and the blend granulated. The diets consist primarily of processed grains (corn, wheat, barley, rice, etc.), gelatinized starches, milk products (dried skim milk, dried whey, lactose, dried whey protein concentrate, casein, etc.), sugars (dextrose, glucose, sucrose), fats and/or oils (lard, grease, vegetable oils, coconut oil, etc.), animal proteins (fishmeal, bloodmeal, meat meal, etc.), and refined, extruded soybeans (soy protein isolate, soy protein concentrate). The amount of the granulated substance is an amount at which the improved growth effects occurs. The granulated substance preferably comprises from greater than 0 to 15% by weight of the base feed.

Spray-dried animal plasma has traditionally been used as a high quality protein used as a replacement for milk proteins due to its effect on growth rate and feed intake. This plasma has also been used in the feed industry as a feed supplement.

Plasma proteins have also been used as an ingredient for veal and calf milk replacers, aquaculture feeds, dog foods, and cat foods for its influence on voluntary feed intake and efficient gains. It is used to replace milk, whey, fish or meat proteins. The effect of granulation of dried plasma is expected to have similar effects on growth and health when used as a supplement in diets prepared for the young of these animals. The dried plasma powder contemplated for use in this invention is comprised of high levels of amino acids. A typical amino acid assay of the powder by acid hydrolysis and subsequent column chromatography results in the following amino acid concentrations (grams per 100 grams of powder):

| | |
|---|---|
| Alanine | 4.2 |
| Arginine | 4.7 |
| Aspartic Acid | 7.9 |
| Cystine | 2.8 |
| Glutamic Acid | 11.7 |
| Glycine | 3.0 |
| Histidine | 2.8 |
| Isoleucine | 2.9 |
| Leucine | 7.8 |
| Lysine | 6.8 |
| Methionine | 0.7 |
| Phenylalanine | 4.6 |
| Proline | 12.8 |
| Serine | 4.7 |
| Threonine | 4.8 |
| Tryptophan | 1.4 |
| Tyrosine | 3.6 |
| Valine | 5.3 |

Chemical and other properties if dried plasma include about 60–80% protein, 9% moisture, 5–20% ash, 2% fat, 50.0 ppm iron, 0.15% calcium, 1.50% chloride; 1.7% phosphorous, 0.09% potassium, aqueous solubility 88%.

Figure 7B:
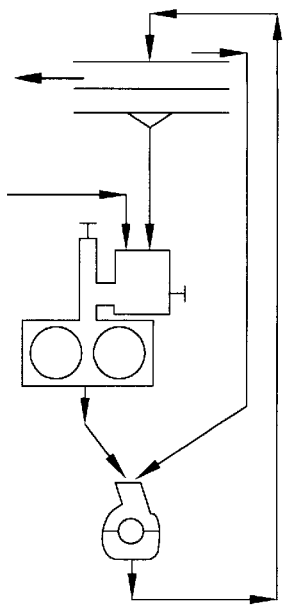
FIG. 7 is a schematic drawing of a typical compaction/granulation system with screening and recycling of overs and fines which may be used in accordance with the present invention.
Figure 7A:
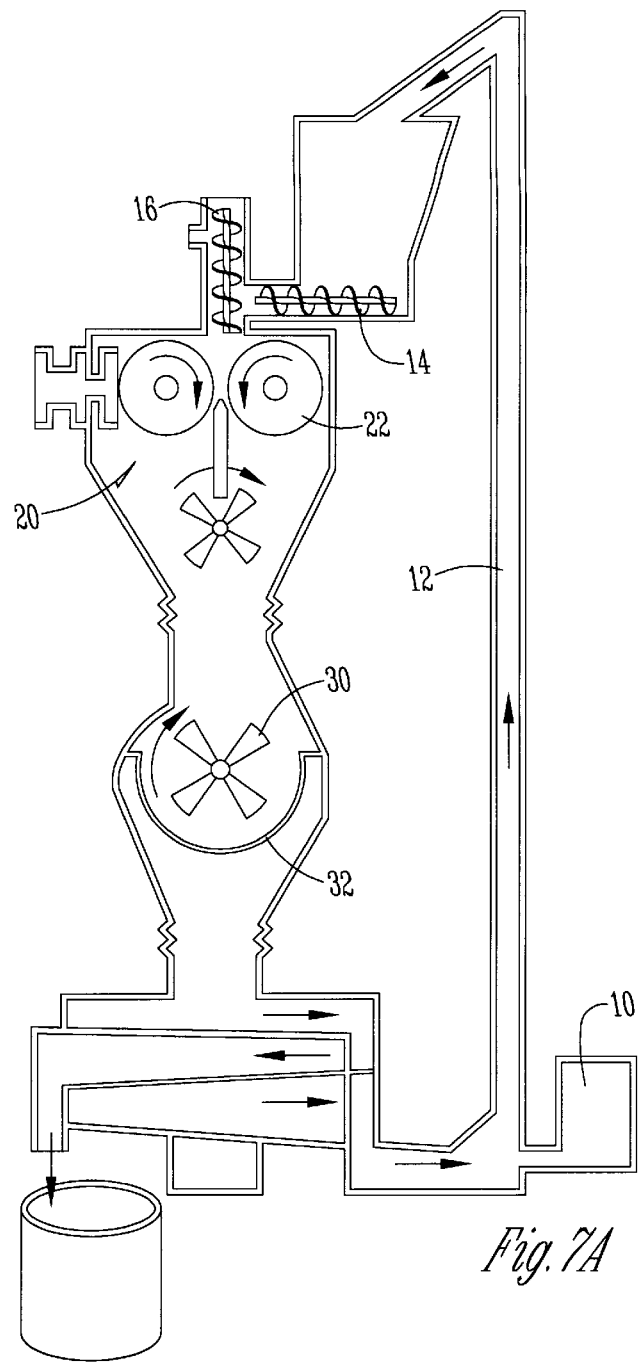
Figure 7C:
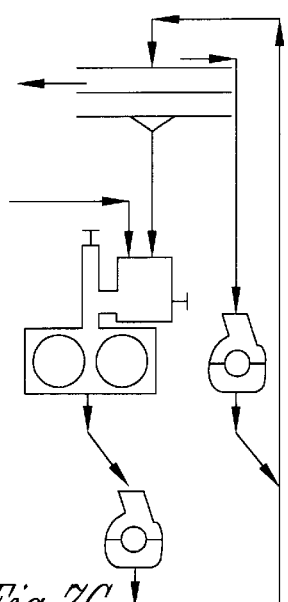

A typical compaction/granulation system for use in the present invention is shown in FIG. 7. The powder feed is designated with the numeral 10. The powder leaves the powder feed 10 and moves upward through the recycle system 12 and into the horizontal feed screw 14. Thereafter, the powder advances to the vertical screw 16 wherein the powder is precompressed and acerated. The precompressed powder next enters the chamber 20 containing compaction rolls (not shown). Therein, a hydraulic actuator regulates the amount of pressure exerted on the rolls. From the chamber 20, the compressed material enters a grinding mill 30 and thereafter passes through a screen (not shown) wherein the granules are screened to the desired size. The granular product of appropriate particle size is then gathered. The overs can be recycles with the fines from the process through the recycle system or may be recycled through the mill 12 wherein the granulation process is repeated. The granular product is then stored in moisture-resistant containers.

Spray-dried animal plasma is commercially available from several sources including American Meat Protein Corporation product sold under the mark of AP 920 ™.

Granulation of feed ingredients is also not new. It has long been used to improve flowability of fine hygroscopic powders. While granulation is an easier form of delivery, it is unexpected that granulation would affect animal performance, beyond simply that which is observed for similar amounts of powder.

Further, because the pig is an analogous gastrointestinal model for the human infant, it is anticipated that the present invention can also be used in conjunction with human supplementation.

Not only does the granulation process increase the bio-efficacy of the plasma proteins, it also increases the flowability of the product and its ease of handling.

The following examples serve to illustrate the invention and are not intended to limit the invention in any way. Those skilled in the art will recognize that there are several different parameters which may be altered using routine experimentation and which are intended to be within the scope of this invention.

EXAMPLE 1

Granular Plasma Studies

Spray-dried plasma has gained wide acceptance as an effective protein source in the Phase I diets of early-weaned pigs due to its stimulatory effect on feed intake and growth rate. Several studies have been conducted to evaluate the effect of plasma on performance when it replaces protein sources such as dried skim milk (DSM) (Hansen et al., 1993; Kats et al., 1994; de Rodas et al., 1995), soybean meal (SBM, Coffey and Cromwell, 1994), or whey (Hansen et al., 1993). The optimal inclusion rate of plasma needed to maximize performance has also been evaluated. Gatnau and Zimmerman (1992) determined that 6% plasma maximize growth and feed intake in a corn-SBM-dried whey diet, while Kats et al. (1994) reported linear increases in daily gain as plasma increased from 0 to 10% with a maximum feed consumption with 8.5% plasma. Based on these results, the inclusion rate of plasma has been recommended to be between 5–10%. Further evaluation of plasma has occurred in different environments such as off-site vs. on-farm (Coffey and Cromwell, 1995) and level of antigen exposure (Stahly et al., 1994). Coffey and Cromwell (1995) demonstrated that pigs reared in conventional, on-farm nurseries respond more to plasma than pigs in cleaner, off-site nurseries. Stahly et al. (1994) evaluated antigen exposure and reported that pigs with a high level of antigen exposure responded more to 6% dietary plasma compared low antigen exposure pigs. Thus, plasma has been shown to be effective in early-weaned diets at various levels and environments.

Animals and Diets. One hundred thirty-five pigs were allotted by weight, sex, and ancestry to a randomized complete block design consisting of three treatments.

Experimental units were represented by pens containing 5 pigs per pen with nine replications per treatment. Pigs were housed in an environmentally controlled nursery. Pigs were given ad libitum access to water and feed.

Spray-dried plasma powder from the same batch of raw material was compressed, ground and screened to the appropriate particle size. The screens removed material that was able to pass through a 12 mesh screen and collected on a 30 mesh screen. The product was then blended into pig starters in two separate experiments.

Dietary treatments were fed from day 0 to 14 consisting of control, 5% dried plasma powder, and 5% dried plasma granules (Table 1). The control diet contained corn, dehulled soybean meal, 20% dried whey, 7.5% lactose, soy protein concentrate, and 5% select menhaden fishmeal. Two additional experimental diets were formulated to contain 5% dried plasma powder or 5% plasma granules, which replaced soy protein concentrate. All diets were fed in meal form and formulated to contain 22% lactose, 1.60% lysine, 0.44% methionine, 0.80% methionine+cystine, 0.80% Ca, and 0.70% P. From day 14 to 34, all pigs were fed a common phase II and III diet from day 15 to 28 and day 28 to 34, respectively. Pigs were weighed and feed intake determined on day 0, 7, 14, and 34. Fecal score was recorded on day 5 and 10 with the following scale: 1) normal, firm but not hard; 2) soft, spreads slightly; 3) runny, spreads readily; and 4) watery, liquid consistency.

Statistical Analysis. Data were analyzed as a randomized complete block design with pen as the experimental unit. Analysis of variance was performed using the General Linear Models procedure of SAS (SAS/STAT Version 6.10, SAS Institute, Cary, N.C.). Model sums of squares consisted of block and treatment. If significant effects due to treatment were detected ($P<0.05$), means were compared by the least significant difference method (Carmer and Swanson, 1973). A single contrast of powder vs. granular spray-dried plasma was performed with significance declared at $P<0.05$.

Body growth rate, feed intake, and efficiency of feed utilization data are presented in Table 2. From days 0 to 7 and 0 to 14, average daily gain (ADG) was increased ($P<0.05$) by addition of 5% dried plasma in either form compared to the control diet with no plasma. On day 7 to 14, addition of 5% plasma granules increased ($P<0.05$) ADG compared to the control diet, while 5% plasma powder was intermediate. From day 14 to 34 postweaning, when all pigs were fed the same diet, no difference was noted in ADG between treatments. Average daily feed intake was similar to ADG of being increased ($P<0.01$) for day 0 to 7 by the addition of dried plasma compared to the control. On day 0 to 14, addition of 5% granular plasma increased ($P<0.05$) average daily food intake (ADFI) compared to the control diet, while 5% plasma powder was intermediate. No difference in ADFI was noted for day 7 to 14 as was demonstrated in ADG; however, addition of either form of dried plasma did demonstrate a numerical increase compared to the control diet with granular plasma having the highest ADFI. As demonstrated with ADG, no significant difference among treatments from day 14 to 34 was noted in ADFI. Efficiency of feed utilization was not significantly different among treatments for phase I (0 to 14 days) or day 14 to 34. However, on day 0 to 7, addition of 5% dried plasma of either form demonstrated a numerically higher efficiency of feed utilization compared to the control diet. The use of granular plasma resulted in more efficient gains than dried plasma powder. On day 0 to 34, addition of 5% granular plasma had a higher ($P<0.05$) gain/feed ratio compared to 5% powder plasma, while the control diet was intermediate.

Fecal scores on d 5 and 10 were not significantly different among treatments.

The present study demonstrated a 70% and 42% increase in ADG and ADFI, respectively for day 0 to 7 due to inclusion of 5% plasma compared to the control diet containing soy protein concentrate. From day 0 to 14, the plasma effect was less pronounced with a 24% increase in ADG, while ADFI was increased 21% with granular plasma, but no difference with powder plasma compared to the control diet. Hansen et al. (1993) compared 10% powder plasma to dried skim milk and demonstrated a 22% and 24% increase in ADG and ADFI, respectively for day 0 to 7. No difference was noted in ADG, ADFI, or gain/feed for day 0–14. At 6% powder plasma, Kats et al. (1994) demonstrated a 45% and 41% increase in ADG and ADFI, respectively for day 0 to 14 compared to dried skim milk. In a study utilizing soybean meal as the control, de Rodas et al. (1995) reported a 56% and 26% increase in ADG and ADFI, respectively due to powder plasma inclusion for day 0 to 7. On day 0 to 14, the plasma effect was less pronounced with a 28% and 21% increase in ADG and ADFI, respectively compared to the soybean meal control. Thus, the current study has demonstrated similar plasma effects compared to other researchers. Assuming a linear response to the dietary addition of plasma from day 0–7 postweaning, the efficacy of granular plasma Vs powdered plasma is 134%. Furthermore, granular plasma resulted in numerical improvements in performance from day 0 to 14.

The data indicate that the physical form of plasma did not inhibit the plasma effect in early-weaned pigs. In fact, pig performance was numerically improved when granular plasma was used in replacement of powdered plasma. Furthermore, granulating plasma may increase the ease of handling and flowability for the feed mill.

The following references are expressly incorporated herein in their entirety by reference.

Coffey, R. D. and G. L. Cromwell. 1995. The impact of environment and antimicrobial agents on the growth response of early-weaned pigs to spray-dried porcine plasma. J. Anim. Sci. 73:2532–2539.

de Rodas, B. Z., K. S. Sohn, C. V. Maxwell, and L. J. Spicer. 1995. Plasma protein for pigs weaned at 19 to 24 days of age: Effect on performance and plasma insulin-like growth factor I, growth hormone, insulin, and glucose concentrations. J. Anim. Sci. 73:3657–3665.

Gatnau, R. and D. R. Zimmerman. 1992. Determination of optimum levels of inclusion of spray-dried porcine plasma (SDPP) in diets for weanling pigs fed in practical conditions. J. Anim. Sci. 70(Suppl. 1):60 (Abstr.).

Hansen, J. A., J. L. Nelssen, R. D. Goodband, and T. L. Weeden. 1993. Evaluation of animal protein supplements in diets of early-weaned pigs. J. Anim. Sci. 71:1853–1862.

Kats, L. J., J. L. Nelssen, M. D. Tokach, R. D. Goodband, J. A. Hansen, and J. L. Laurin. 1994. The effect of spray-dried porcine plasma on growth performance in the early-weaned pig. J. Anim. Sci. 72:2975–2981.

Stahly, T. S., S. G. Swenson, D. R. Zimmerman, and N. H. Williams. 1994. Impact of porcine plasma proteins on postweaning growth of pigs with a low and high level of antigen exposure. ISU Swine Research Report pp. 3–5.

TABLE 1

Composition of Experimental Diets fed from days 0 to 14 (as fed, %).

| Ingredient | Control | Spray-dried Powder Plasma | Spray-dried Granular Plasma |
|---|---|---|---|
| Corn | 33.73 | 34.05 | 34.05 |
| Soybean meal, 47% CP | 20.00 | 20.00 | 20.00 |
| Dried whey | 20.00 | 20.00 | 20.00 |
| Lactose | 7.50 | 7.50 | 7.50 |
| Soybean oil | 5.00 | 5.00 | 5.00 |
| Select menhaden fishmeal | 5.00 | 5.00 | 5.00 |
| Profine | 5.00 | — | — |
| Spray-dried powder plasma | — | 5.00 | — |
| Spray-dried granular plasma | — | — | 5.00 |
| AP 301 | 1.25 | 1.25 | 1.25 |
| Dicalcium phosphate | 0.85 | 0.55 | 0.55 |
| Vitamin-trace mineral mix | 0.55 | 0.55 | 0.55 |
| Additive | 0.50 | 0.50 | 0.50 |
| Zinc oxide | 0.30 | 0.30 | 0.30 |
| L-lysine-HCl | 0.15 | — | — |
| Limestone | 0.13 | 0.30 | 0.30 |
| DL-Methionine | 0.04 | 0.04 | 0.04 |

TABLE 2

Performance of pigs fed control, spray-dried powder plasma, or spray-dried granular plasma

| Item | Control | Spray-dried Powder Plasma | Spray-dried Granular Plasma | SEM[1] | P[2] |
|---|---|---|---|---|---|
| Days 0 to 7 | | | | | |
| ADG, kg | 0.094[b] | 0.151[a] | 0.169[a] | 0.017 | 0.0151 |
| ADFI, kg | 0.128[b] | 0.181[a] | 0.183[a] | 0.011 | 0.0049 |
| Gain/feed | 0.578 | 0.827 | 0.936 | 0.113 | NS |
| Days 7 to 14 | | | | | |
| ADG, kg | 0.382[b] | 0.425[ab] | 0.448[a] | 0.017 | 0.0458 |
| ADFI, kg | 0.455 | 0.503 | 0.528 | 0.023 | NS |
| Gain/feed | 0.852 | 0.847 | 0.848 | 0.028 | NS |
| Days 0 to 14 | | | | | |
| ADG, kg | 0.241[b] | 0.288[a] | 0.309[a] | 0.015 | 0.0174 |
| ADFI, kg | 0.294[b] | 0.342[ab] | 0.356[a] | 0.017 | 0.0466 |
| Gain/feed | 0.817 | 0.842 | 0.869 | 0.019 | NS |
| Days 14 to 34 | | | | | |
| ADG, kg | 0.520 | 0.511 | 0.515 | 0.013 | NS |
| ADFI, kg | 0.819 | 0.820 | 0.804 | 0.014 | NS |
| Gain/feed | 0.633 | 0.619 | 0.639 | 0.011 | NS |
| Days 0 to 34 | | | | | |
| ADG, kg | 0.402 | 0.415 | 0.430 | 0.009 | NS |
| ADFI, kg | 0.601 | 0.623 | 0.619 | 0.012 | NS |
| Gain/feed | 0.668[ab] | 0.665[b] | 0.694[a] | 0.009 | 0.0663 |
| Fecal score | | | | | |
| Day 5 | 2.00 | 1.94 | 2.08 | 0.124 | NS |
| Day 10 | 2.11 | 2.08 | 2.06 | 0.097 | NS |

[1]Standard error of the mean.
[2]NS = Not significant (P > 0.10).
[ab]Means in the same row not sharing common superscript letters differ (P < 0.05).

EXAMPLE 2
The Efficacy of Granular Plasma Relative to Powdered Plasma in Pig Starter Diets The effect of physical form of spray-dried animal plasma was evaluated in meal-form pig starters in a previous experiment. The bio-efficacy of granular plasma in the previous experiment was numerically superior to plasma powder. Plasma protein is composed of several proteins that can be denatured by high temperatures (>200° F.), pH (<3), and digestive enzymes. A reduction in the loss of plasma protein by denaturation may improve the performance of the pig. The objective of this experiment was to establish the efficacy of granular plasma relative to powdered plasma in pig starter diets manufactured at 2 pelleting temperatures.

Animals and Diets. 240 pigs averaging 5.8 kg and 17 d of age were allotted by weight and gender to a randomized complete block design consisting of 10 treatments. Experimental units were represented by 4'×8' pens containing 12 pigs per pen with 2 replications per treatment. Pigs were housed in an environmentally controlled nursery with an average temperature of 90° F. over the first two weeks postweaning. Pigs were given ad libitum access to waterers and feeders.

Spray-dried plasma powder from the same batch of raw material was compressed, ground and screened to the appropriate particle size. The screens removed material that was unable to pass through a 12 mesh screen and collected on a 30 mesh screen. The corn-soybean meal based diets contained 20% whey and 5 fishmeal (Table 3). Soy protein concentrate was replaced with the appropriate plasma source. Diets were formulated to contain 1.60% lysine. The experimental diets were fed from day 0–14 of the experiment. Pen weights and feed intakes were collected on day 0, 7, 14 days post-weaning.

The factorial arrangement of treatments consisted of 2 plasma sources (plasma powder or granular plasma), 2 pelleting temperatures (140 or 180° F.) and 3 levels of dried plasma (0, 3.75, and 7.5% of the diet). The negative control diet was not duplicated in the experimental design resulting in 10 dietary treatments. The bio-efficacy of granular plasma relative to powdered plasma was determined for periods in which the response to plasma was linear and the slope was positive. The bio-efficacy is calculated as a ratio of the slopes: (Slope of granular plasma/Slope of powdered plasma) ×100.

Statistical methods/model: The data was analyzed as a randomized complete block design (2 temperatures, 2 sources, and 3 levels) using the GLM procedures of SAS. Least squares means for treatments are reported and P<0.05 is considered significant, while P<0.10 indicates a trend. Differences among treatment means were determined by LSD procedures of GLM.

Pelleting temperature, plasma source and level of plasma all affected performance in the first two weeks postweaning (Tables 4 and 5). A linear, positive response (ADG, ADFI and F:G) to plasma level was detected from day 0–7 postweaning (P<0.05), which validates the calculations for relative bio-efficacy of granular to powdered plasma in this period. The efficacy of granular plasma relative to powdered plasma (100%) from day 0–7 postweaning is 147%. Under the conditions of this experiment, the performance improvement of granular plasma continued from day 7–14 (P<0.01) while the effect of powdered plasma was no longer positive. Pigs fed the diets supplemented with granular plasma performed significantly better than pigs fed diets supplemented with powdered plasma (P<0.05). The observation of a lack of performance benefit in the 7–14 day period to powdered plasma is not uncommon in this period. The significant improvement in performance with the use of granular plasma in this period demonstrates its markedly improved efficacy when compared to powdered plasma.

TABLE 3

Composition of Experimental Diets, expressed on an as-is basis (%).

|  | Control | 3.75% Plasma | 7.5% Plasma |
|---|---|---|---|
| Corn | 38.14 | 39.32 | 39.40 |
| Whey-Fat Mix | 20.00 | 20.00 | 20.00 |
| 48 SBM | 18.00 | 18.00 | 18.00 |
| Profine E | 8.15 | 3.40 | |
| Dried Plasma | | 3.75 | 7.50 |
| Whole Whey | 6.00 | 6.00 | 6.00 |
| Fish Meal, Menhaden | 5.00 | 5.00 | 5.00 |
| Animal Fat | 2.60 | 2.60 | 2.60 |
| Mono Dical 21 | 0.48 | 0.34 | 0.17 |
| Zinc Oxide | 0.30 | 0.30 | 0.30 |
| Salt | 0.30 | 0.30 | 0.18 |
| Mecadox 10 | 0.25 | 0.25 | 0.25 |
| Lysine HCl 98 | 0.20 | 0.13 | |
| Sodium Propionate | 0.15 | 0.15 | 0.15 |
| Vitamin Premix | 0.15 | 0.15 | 0.15 |
| Trace Mineral Premix | 0.10 | 0.10 | 0.10 |
| Flavor | 0.10 | 0.10 | 0.10 |
| Copper Sulfate | 0.05 | 0.05 | 0.05 |
| DL-Methionine | 0.035 | 0.055 | 0.057 |
| Calculated Nutrients | | | |
| Crude Protein | 23.13 | 22.97 | 23.54 |
| Fat | 7.01 | 7.09 | 7.14 |
| ME, Swine | 1560 | 1561 | 1569 |
| Lactose | 14.42 | 14.42 | 14.42 |
| Calcium | 0.98 | 0.94 | 0.91 |
| Phosphorus | 0.70 | 0.70 | 0.70 |
| Sodium | 0.43 | 0.54 | 0.61 |
| Chloride | 0.58 | 0.S3 | 0.62 |
| Lysine | 1.60 | 1.60 | 1.60 |
| Methionine | 0.44 | 0.44 | 0.44 |
| Meth + Cys | 0.82 | 0.88 | 0.95 |
| Tryptophan | 0.30 | 0.32 | 0.34 |
| Threonine | 1.02 | 1.06 | 1.15 |
| Isoleucine | 1.12 | 1.09 | 1.10 |

TABLE 4

The effect of plasma type, plasma level and pelleting temperature on the performance of weaned pigs.

| Source | Plasma Powder | | | | | | Granular Plasma | | | | | | |
|---|---|---|---|---|---|---|---|---|---|---|---|---|---|
| Temp | | 140 | | | 180 | | | 140 | | | 180 | | |
| Level | 0 | 3.75 | 7.5 | 0 | 3.75 | 7.5 | 0 | 3.75 | 7.5 | 0 | 3.75 | 7.5 | SE |
| D 0-7 | | | | | | | | | | | | | |
| ADG, kg | .172 | .175 | .245 | .158 | .195 | .164 | .172 | .202 | .246 | .158 | .179 | .203 | .020 |
| ADFI, kg | .218 | .200 | .263 | .201 | .231 | .230 | .218 | .208 | .255 | .201 | .217 | .228 | .016 |
| F:G | 1.30 | 1.17 | 1.08 | 1.38 | 1.23 | 1.42 | 1.30 | 1.04 | 1.04 | 1.38 | 1.22 | 1.12 | .105 |
| D 7-14 | | | | | | | | | | | | | |
| ADG, kg | .389 | .327 | .345 | .337 | .343 | .317 | .389 | .362 | .398 | .337 | .380 | .353 | .019 |
| ADFI, kg | .433 | .404 | .445 | .481 | .456 | .417 | .433 | .421 | .449 | .407 | .452 | .441 | .015 |
| F:G | 1.12 | 1.24 | 1.30 | 1.22 | 1.33 | 1.32 | 1.12 | 1.16 | 1.13 | 1.22 | 1.19 | 1.25 | .039 |
| D 0-14 | | | | | | | | | | | | | |
| ADG, kg | .280 | .251 | .295 | .250 | .269 | .240 | .280 | .282 | .322 | .250 | .279 | .278 | .010 |
| ADFI, kg | .326 | .302 | .354 | .305 | .343 | .324 | .326 | .314 | .352 | .308 | .334 | .334 | .011 |
| F:G | 1.16 | 1.20 | 1.20 | 1.23 | 1.28 | 1.34 | 1.16 | 1.11 | 1.09 | 1.23 | 1.20 | 1.20 | .014 |

| | | | | |
|---|---|---|---|---|
| D 0-7 ADG | source = NS | level = .0104 | temp = .0417 | 3.75 vs7.5 = .0785 |
| D 0-7 ADFI | source = NS | level = .0093 | temp = NS | 3.75 vs7.5 = .0119 |
| D 0-7 FG | source = NS | level - .0272 | temp = .0218 | 3.75 vs7.5 = NS |
| D 7-14 FG | source = .0016 | level = .0165 | temp = .0019 | 3.75 vs7.5 = NS    S*L = .0495 |
| D 7-14 ADG | source = .0185 | level = NS | temp = .0361 | L*T = .0374 3.75 vs 7.5 = NS |
| D 7-14 ADFI | source = NS | level = NS | temp = NS | L*T = .0040 3.75 vs 7.5 = NS |
| D 0-14 ADG | source = .0103 | level = .0637 | temp = .0013 | L*T = .0051 3.75 vs 7.5 = .0916 |
| D 0-14 ADPI | source = NS | level = .0024 | temp = NS | L*T = .0017 3.75 vs 7.5 = .0199 |
| D 0-14 FG | source = .0001 | level = NS | temp - .0001 | L*T = .0249 S*L = .0001    3.75 vs 7.5 = NS |

NS = P > 0.10

TABLE 5

The effect of plasma source and plasma level on the performance of weaned pigs.

| Source | Plasma Powder | | | Granular Plasma | | | |
|---|---|---|---|---|---|---|---|
| Level | 0 | 3.75 | 7.5 | 0 | 3.75 | 7.5 | SE |
| D 0-7 | | | | | | | |
| ADG, kg | .165 | .185 | .204 | .165 | .190 | .225 | .014 |
| ADFI, kg | .210 | .215 | .247 | .210 | .213 | .242 | .011 |
| F:G | 1.34 | 1.20 | 1.25 | 1.34 | 1.13 | 1.08 | .074 |
| D 7-14 | | | | | | | |
| ADG, kg | .363 | .335 | .331 | .363 | .371 | .376 | .013 |
| ADFI, kg | .420 | .430 | .431 | .420 | .436 | .445 | .010 |
| F:G | 1.17 | 1.29 | 1.31 | 1.17 | 1.18 | 1.19 | .027 |
| D 0-14 | | | | | | | |
| ADG, kg | .265 | .260 | .268 | .265 | .281 | .300 | .007 |
| ADFI, kg | .317 | .323 | .339 | .317 | .324 | .343 | .008 |
| F:G | 1.20 | 1.24 | 1.27 | 1.20 | 1.16 | 1.15 | .010 |

EXAMPLE 3

Granulation and Spray Dried Blood Cells

An additional experiment was conducted comparing spray dried blood cells rather than the plasma component of blood. The cellular material was collected as described herein, spray dried, and optionally granulated. The material was then fed to young pigs according to the methods disclosed earlier.

Briefly, eight replicate pens of 5 pigs/pen were used in a 21 day experiment (12.6 pounds, 21 days). The diets were formulated with corn, soybean meal, 20% whey and 3.75% blood meal. All diets were formulated to contain 1.15% lysine. The control diet was formulated to 17.1% crude protein and the supplemental amino acid diet was formulated to 16.2% crude protein L-lysine HCL and DL-methionine were used to balance the diets for lysine and methionine. The effects are summarized in Table 7.

TABLE 6

Effect of Granulation of Spray Dried Animal Blood Cells and L-Lysine HCL and DL-Methionine Additions on Growth Performance of Early Weaned Pigs

| | | Main Effects | | | |
|---|---|---|---|---|---|
| | | Intact protein | Amino acids | AP 301 | AP 301 G |
| ADG | 0–7 d | 0.15 | 0.14 | 0.14 | 0.15 |
| | 7–21 d[a] | 0.54 | 0.60 | 0.59 | 0.56 |
| | 0–21 d[a] | 0.41 | 0.46 | 0.43 | 0.43 |
| ADF | 0–7 d | 0.28 | 0.27 | 0.27 | 0.28 |
| | 7–21 d[a] | 0.88 | 0.95 | 0.93 | 0.91 |
| | 0–21 d | 0.68 | 0.72 | 0.72 | 0.69 |
| F/G | 0–7 d | 2.69 | 2.45 | 3.14 | 2.00 |
| | 7–21 d | 1.71 | 1.59 | 1.68 | 1.61 |
| | 0–21 d | 1.68 | 1.61 | 1.67 | 1.63 |

[a]Intact protein vs supplemental amino acids (P < .05).

As can be seen, the granulation procedure did not change the feeding value of spray dried animal blood cells. This is in stark contrast to the results observed with granulating the plasma component.

What is claimed is:

1. A method of increasing weight gain and improving feed efficiency of animals in the first stages of life comprising:
    administering said animals a supplement consisting essentially of granulated animal plasma made by the process of:
    drying said animal plasma;
    compressing said dried animal plasma at about 1200–1400 psi; and
    screening said compressed dried animal plasma to form granulated particles;
    wherein each of the resulting granulated particles has a size greater than about 100 microns but less than about 2000 microns;
    and further providing that the bulk density of the granulated particles is about 50 pounds per cubic foot.

2. The method of claim 1 wherein said administration is by oral administration.

3. The method of claim 1 wherein said feed supplement is administered to animals in a ratio of greater than 0 up to 15% by weight of the animal ration.

4. The method of claim 1 wherein said feed supplement is administered to animals during the first ten weeks of life.

5. The method of claim 1 wherein said animal is a pig.

6. The method of claim 1 wherein said administration is from birth to seven weeks of age.

7. The method of claim 1 wherein said animal is selected from the group consisting of:
    a cat, dog, calf, lamb, chicken, turkey, duck, horse, goat, pig, llama, or human.

8. A method according to claim 1 wherein the dried animal plasma is isolated from a blood source selected from the group consisting of porcine, bovine, ovine, equine, and avian, species.

9. A method according to claim 8 wherein the blood source is selected from the group consisting of porcine and bovine.

* * * * *